United States Patent [19]

Ostlinning et al.

[11] Patent Number: 4,501,884

[45] Date of Patent: Feb. 26, 1985

[54] PROCESS FOR THE PRODUCTION OF OPTIONALLY BRANCHED POLYARYLENE SULPHIDE WITH PIPERAZINONE SOLVENT

[75] Inventors: Edgar Ostlinning, Duesseldorf; Karsten Idel, Krefeld, both of Fed. Rep. of Germany

[73] Assignee: Bayer Aktiengesellschaft, Leverkusen, Fed. Rep. of Germany

[21] Appl. No.: 546,883

[22] Filed: Oct. 31, 1983

[30] Foreign Application Priority Data

Nov. 10, 1982 [DE] Fed. Rep. of Germany ....... 3241514

[51] Int. Cl.$^3$ ............................................. C08G 75/14
[52] U.S. Cl. .................................... 528/388; 528/381
[58] Field of Search ............................... 528/388, 381

[56] References Cited

U.S. PATENT DOCUMENTS 4,024,118  5/1977  Campbell et al. .................... 528/388

Primary Examiner—Harold D. Anderson
Attorney, Agent, or Firm—Connolly and Hutz

[57] ABSTRACT

This invention relates to a process for the production of optionally branched polyarylene sulphides in piperazinones as solvent.

9 Claims, No Drawings

PROCESS FOR THE PRODUCTION OF OPTIONALLY BRANCHED POLYARYLENE SULPHIDE WITH PIPERAZINONE SOLVENT

Polyarylene sulphides and methods for their production are known (for example U.S. Pat. Nos. 2,513,188; 2,538,941; 3,354,129; 3,876,592; JA-OS No. 5,554,330 (1980), DE-AS No. 2,453,749, DE-OS Nos. 2,623,333; 2,623,362, 2,623,363; 2,930,710; 2,930,797 and 3,019,732).

These processes have to be carried out under elevated pressure in order to obtain good yields. Moreover, these processes are restricted to the use of a small number of solvents.

In the process according to U.S. Pat. No. 3,354,129, the following, for example are stated as solvents: amides, lactams and sulphones, such as hexamethylphosphoric acid triamide, tetramethylurea, N,N'-ethylenedipyrrolidone-(2), methylpyrrolidone-(2) (NMP), pyrrolidone-(2), caprolactam, N-ethylcaprolactam, sulpholane, dimethylacetamide and low molecular weight polyamides. In JA-OS No. 5,554,330 (1980), 1,3-dimethylimidazolidinone-(2) is used as solvent on its own or in admixture with N-methylpyrrolidone.

Polyarylene sulphides are produced in a high yield in the known pressure processes. However, a reduction in pressure, for example by lowering the temperature drastically, results in a reduction in yield. Polyarlyene sulphides may be produced in an acceptable yield under normal pressure only in N-methylpyrrolidone and 1,3-dimethylimidazolidinone-(2). However, in this case as well, the yield which may be achieved is heavily dependent on the solvent which is used. Thus, for example when N-methylpiperidone-(2) is used, polyarylene sulphide is obtained in a yield of 32%, whereas when N-methylpyrrolidone is used, 54% yield of polyarylene sulphide is obtained. Therefore, the reaction is greatly influenced by the molecular structure of the particular solvent used. Even slight changes in the molecular structure of the solvent may considerably reduce the yields.

It has now been found that optionally branched polyarylene sulphides may be produced in high yields under normal pressure or under only slight excess pressure when polyhalogen aromatic compounds and alkali sulphides are reacted in known manner using piperazinones as solvent, optionally in the presence of a catalyst and/or a co-solvent. This was unexpected, because the molecular structure of the solvent is drastically changed by the use of a piperazinone instead of a lactam ring.

Piperazinones which may be used in the process according to the present invention are known, for example from U.S. Pat. Nos. 2,649,450 and 4,297,497.

The present invention provides a process for the production of optionally branched polyarylene sulphides which comprises reacting (a) 0 to 100 mol %, preferably 50 to 100 mol %, of dihalogen aromatic compounds corresponding to the formula:

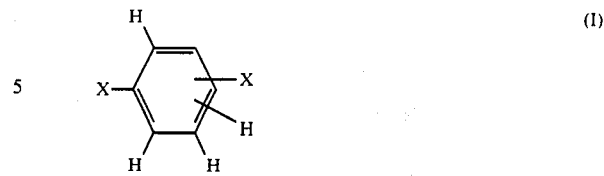

and from 100 to 0 mol %, preferably 0 to 50 mol %, dihalogen aromatic compounds corresponding to the formula:

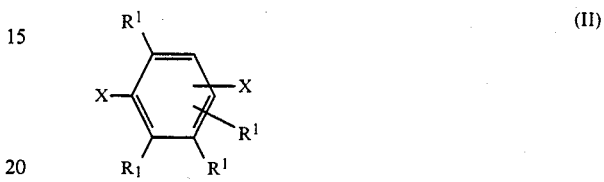

wherein
X represents chlorine or bromine in meta- or para-position relative to each other, and
$R^1$ is the same or different and represents hydrogen, alkyl, cycloalkyl, aryl, alkylaryl, arylakyl, and two orth-positioned radicals $R^1$ may be linked to form an aromatic or heterocyclic ring, and one radical $R^1$ is always different from hydrogen, with (b) 0 to 3 mol % preferably from 0.1 to 2.9 mol %, and more preferably from 0.4 to 2.4 mol%, based on the total of the dihalogen aromatic compounds corresponding to formulae I and II, of a tri- or tetra-halogen aromatic compound corresponding to the formula:

$$ArX_n \qquad (III)$$

wherein
Ar represents an aromatic or heterocyclic radical,
X represents chlorine or bromine, and
n represents 3 or 4, and (c) alkali metal sulphides, preferably sodium or potassium sulphid or the mixture thereof, preferably in the form of the hydrates thereof or aqueous mixtures, optionally together with alkali hydroxides, such as sodium- and potassium hydroxide, the molar ratio of (a+b):c ranging from 0.85:1 to 1.15:1, in the presence of (d) an organic solvent, optionally with the simultaneous use of catalysts and/or co-solvents, characterised in that piperzinones are used as organic solvent (d), in that the molar ratio of alkali sulphides (c) to the organic solvent (d) ranges from 1:2 to 1:15, and in that the reaction is carried out at a temperature of from 160° to 265° C., preferably from 165° to 250° C.

Conventional substances may be used as catalysts in their normal quantities, for example alkali fluorides and alkali carboxylates.

N,N-dialkylcarboxylic acid amides of $C_1$–$C_8$ aliphatic and $C_6$–$C_{12}$ aromatic carboxylic acids may be used, for example as co-solvents in a quantity of from 0.02 to 1.0 mols, based on 1 mol of alkali sulphide.

$R_1$ in formula (II) preferably represents hydrogen, $C_1$–$C_{20}$ alkyl, $C_5$–$C_{20}$ cycloalkyl, $C_6$–$C_{24}$ aryl, $C_7$–$C_{24}$ alkylaryl or $C_7$–$C_{24}$ aralkyl. Furthermore, two ortho-positioned radicals $R^1$ relative to each other may form a condensed aromatic ring having a total of 6 carbon atoms, or a condensed hetero cyclic ring having 5 or 6 ring atoms and from 1 to 3 heteroatoms, such as N, O and S;

Ar preferably represents an aromatic radical having from 6 to 24 carbon atoms or a heterocylic radical having from 6 to 24 ring atoms, more preferably an aromatic ring having from 6 to 10 carbon atoms or a heterocyclic radical having from 6 to 10 ring atoms, and the heterocyclic radicals may contain up to 3 heteroatoms, such as N, S and O.

Alkali sulphides are used in conventional quantities and in a conventional manner. For example, lithium, sodium, potassium and rubidium sulphide are suitable, preferably sodium and potassium sulphide. Alkali sulphides may be used which are produced from hydrogen sulphides and alkali hydroxides, such as LiOH, NaOH and KOH. In any case, mixtures of the sulphides and of the hydroxides may be used.

The alkali sulphides may be dehydrated in one or more steps, for example by distilling off water from the reaction solution. It is an advantage of the present process that the dehydration operation does not need to be complete. A partial dehydration up to a residual water content of about 1.5 mols per mol of $Na_2S$ is sufficient. The partial dehydration should be concluded before the dihalogen compound corresponding to formulae (I) and (II) is added.

N,N'-dialkylcarboxylic acid amides which may be used as co-solvents are preferably added before dehydration of the alkali sulphides. However, it is possible to add the co-solvents together with the polyhalogen compounds to the dehydrated reaction mixture.

The components may be added in any sequence. The dihalogen aromatic compounds corresponding to the formulae (I) and (II) and the tri- or tetra-halogen aromatic compounds corresponding to formula (III) may be added to the alkali sulphide, to the solvent or to a part thereof together or separately, continuously, in portions or directly all at once. Thus, for example alkali sulphide may be added together with the solvent or a part thereof to the compounds corresponding to formulae (I), (II) and (III). All the reactants may also be directly added together. Any other combination of the reactants is also possible.

According to the present invention, mixtures of meta- and para-dihalogen aromatic compounds corresponding to formula (I) or (II) may be used. In this case, the molar ratio of m:p is to amount at most to 30:70.

For the production of the thermoplastically processible polyphenylene sulphides, p-dihalogen aromatic compounds are more preferably used.

Examples of dihalogen aromatic compounds corresponding to formula (I) to be used according to the present invention include the following: p-difluorobenzene, p-dichlorobenzene, p-dibromobenzene, p-diiodobenzene, 1-fluoro-4-chlorobenzene, 1-fluoro-4-bromobenzene, 1-chloro-4-bromobenzene, 1-chloro-4-iodobenzene, 1-bromo-4-iodobenzene, 1,3-difluorobenzene, 1,3-dichlorobenzene, 1,3-dibromobenzene, 1,3-diiodobenzene, 1-fluoro-3-chlorobenzene, 1-fluoro-3-bromobenzene, 1-fluoro-3-iodobenzene, 1-chloro-3-iodobenzene and 1-bromo-3-iodobenzene. They may be used on their own or mixed together. 1,4-dichlorobenzene and/or 1,3-dibromobenzene are particularly preferred.

Examples of dihalogen aromatic compounds corresponding to formula (II) to be used according to the present invention include the following: 2,5-dichlorotoluene, 2,5-dichloroxylene, 1-ethyl-2,5-dichlorobenzene, 1-ethyl-2,5-dibromobenzene, 1-ethyl-2-bromo-5-chlorobenzene, 1,2,4,5-tetramethyl-3,5-dichlorobenzene, 1-cyclohexyl-2,5-dichlorobenzene, 1-phenyl-2,5-dichlorobenzene, 1-benzyl-2,5-dichlorobenzene, 1-phenyl-2,5-dibromobenzene, 1-p-tolyl-2,5-dichlorobenzene, 1-p-tolyl-2,5-dibromobenzene, 1-hexyl-2,5-dichlorobenzene, 2,4-dichlorotoluene, 2,4-dichloroxylene, 2,4-dibromocumene, 1-cyclohexyl-3,5-dichlorobenzene and 1-phenyl-3,5-difluoro-benzene. They may be used on their own or mixed together.

Examples of tri- or tetra-halogen aromatic compounds corresponding to formula (III) to be used according to the present invention include the following: 1,2,3-trichlorobenzene, 1,2,4-trichlorobenzene, 1,2,4-tribromobenzene, 1,2,4-triiodobenzene, 1,3,5-trichloro-2,4,6-trimethylbenzene, 1,2,3-trichloronaphthalene, 1,2,4-trichloronaphthalene, 1,2,6-trichloronaphthalene, 2,3,4-trichlorotoluene, 2,3,6-trichlorotoluene, 1,2,3,4-tetrachloronaphthalene, 1,2,4,5-tetrachlorobenzene, 2,2'-4,4'-tetrachlorobiphenyl and 1,3,5-trichloro-triazine.

If branched polyarylene sulphides are to be produced, at least 0.1 mol % of a tri- or tetrahalogen aromatic compound corresponding to formula (III) must be used.

Piperazinones which are suitable according to the present invention are compounds corresponding to formula (IV):

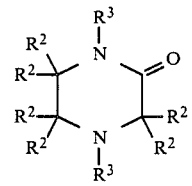

wherein $R^2$ and $R^3$ which may be the same or different, each represents hydrogen, $C_1$–$C_8$ alkyl, $C_6$–$C_{12}$ aryl, $C_7$–$C_{20}$ aralkyl or $C_5$–$C_{15}$ cycloalkyl, or two radicals $R^2$ may be linked to form an aromatic or cycloaliphatic ring.

Preferably $R^2$ and $R^3$ represent hydrogen, $C_1$–$C_3$ alkyl, $C_5$–$C_6$ cycloalkyl, phenyl or benzyl, and $R^2$ more preferably represents hydrogen and $R^3$ more preferably represents $C_1$–$C_3$ alkyl.

The following are mentioned by way of example: 1-methylpiperazinone-(3), 1-methylpiperazinone-(2), 1,4-dimethylpiperazinone and 1-methyl-4-isopropyl-piperazinone-(2).

The reaction according to the present invention is carried out at a temperature of from 160° to 265° C., preferably from 165° to 250° C.

The reaction may last up to 12 hours, and preferably from 1 to 9 hours. A gradual increase in the reaction temperature during this time may be advantageous.

The operations of working up the reaction mixture and of isolating the polyarylene sulphides may be carried out in known manner.

The polyarylene sulphide may be directly separated from the reaction solution or only, for example after the addition of water and/or dilute acid by conventional methods (for example by filtration or centrifugation).

A wash with water to remove inorganic constituents which may adhere to the polymers (for example residues of alkali sulphides and alkali chlorides) generally follows filtration.

A wash or extraction with other washing liquids which may also be carried out in addition to, or subsequent to this wash is of course also possible.

The polymer may also be obtained by drawing off the solvent from the reaction chamber and by a subsequent wash, as just described.

The polyarylene sulphides obtained by the process according to the present invention may also be mixed with other polymers, with pigments and fillers, for example graphite, metal powder, glass powder, quartz powder or glass fibres, or they may be mixed with conventional additives for polyarylene sulphides, for example stabilizers or mould-release agents.

The polyarylene sulphides of this invention may be used, for example, as an embedding composition for electronic component parts, as sealing rings, as parts of office machines and communication equipment.

The invention is illustrated by the following Examples:

EXAMPLES

Comparative Example 1

700 g of N-methyl pyrrolidone, 226 g of $Na_2S \times H_2O$ ($\triangleq 1.80$ mols) and 11.1 g of NaOH are weighed into a 2 liter three-necked flask equipped with a thermometer, a stirrer and a fractionating column, under nitrogen, and heated to 196° C. During this operation, 98.4 g of liquid distilled off which essentially consisted of $H_2O$. After cooling the mixture to 160° C., 264.1 g of p-dichlorobenzene ($\triangleq 1.80$ mols) and 160 g of N-methylpyrrolidone were added, and the reaction mixture was refluxed for 9 hours. The mixture at 160° C. was poured into 2 liters of distilled $H_2O$. The precipitating solids were washed with distilled $H_2O$ and then dried at 120° C. under a water jet vacuum. The white product weighed 104.9 g ($\triangleq 54.0\%$ yield, based on p-dichlorobenzene) and had a melting range of from 272° to 276° C.

Comparative Example 2

Production of polyphenylene sulphide according to U.S. Pat. No. 3,354,129.

129 g of sodium sulphide trihydrate (corresponding to 1 mol of $Na_2S$) and 300 g of N-methyl-2-pyrrolidone were introduced together into a stirrer-equipped autoclave. The mixture was flushed with nitrogen and was slowly heated to 202° C. A total of 19 ml of water distilled off during this operation. The mixture was then cooled to about 160° C., and 147 g of p-dichlorobenzene ($\triangleq 1$ mol) in about 50 g of N-methyl-2-pyrrolidone were added. The reaction mixture is heated to 245° C. over a period of 30 minutes under a nitrogen preliminary pressure of 2.5 bars, during which the pressure rises to 10 bars, and this temperature is maintained for 3 hours. After cooling to room temperature, a grey solid substance is isolated which is then washed with water. It is dried under vacuum at 80° C., and 100.3 g (93%) of a poly-p-phenylene sulphide are obtained which is light brown in colour and has a melting range of from 276° to 283° C.

Comparative Example 3

Like Comparative Example 1, but with N-methylpiperidine instead of N-methylpyrrolidone as solvent. 62.7 g of white product ($\triangleq 32.3\%$ yield) were obtained having a melting range of from 265° to 273° C.

Comparative Example 4

Production of p-polyphenylene sulphide according to JA-PS No. 55-54 330 (of 21.4.80) Example 2 36.06 g ($\triangleq 0.15$ mols) of sodium sulphide-nonahydrate and 150 ml of N,N'-dimethylethylene urea were weighed into a 500 ml reaction vessel having an $N_2$-inlet and a gas phase outlet. The mixture was flushed with nitrogen and then slowly heated to a temperature of from 200° to 225° C. During this operation, 25.9 g of distillate, which mainly consisted of water, were obtained. After cooling the reaction vessel, 22.15 g ($\triangleq 0.15$ mols) of p-dichlorobenzene were added. The mixture was heated to 220°–225° C. under nitrogen and under normal pressure. After 4 hours, the reaction mixture was separated by filtration. The crude product was washed for 4 hours in about 1 liter of distilled water at 70° C. After filtration, it was washed for 2 hours in methanol at 50° C. 9.39 (67.9% yield) of light-grey product were obtained having a melting range of from 272° to 279° C.

Example 1

The procedure was as for Comparative Example 1, but 1,4-dimethylpiperazinone is used as solvent.

The white product weighed 154.1 g ($\triangleq 79.2\%$ yield) and had a melting range of 278°–283° C.

Example 2

The procedure was as for Example 1, but 91.8 g of lithium acetate dihydrate (50 mol % based on $Na_2S$) were used in addition to $Na_2S \times H_2O$.

163.6 g of white product (84.2% yield) were isolated having a melting range of 277°–283° C.

Example 3 (Production of a branched polyarylene sulphide)

The procedure was as for Example 1, but 24.2 g (15 ml %, based on $Na_2S$) of dimethyl acetamide and 2.5 g 1,2,4-trichlorobenzene (0.77 mol %, based on dichlorobenzene) were also used. The white product weighed 161.9 g (83.3% yield based on $Na_2S$) and had a melting range of 279°–284° C.

Example 4 (Production of a branched polyarylene sulphide)

95.8 g (0.75 mols) of sodium sulphide hydrate, 5.0 g (0.056 mols) of 45% NaOH, 61.5 g (0.75 mols) of sodium acetate and 300 g of 1,4-dimethylpiperazinone were weighed into a stirrer-equipped autoclave. The mixture was flushed with nitrogen and was slowly heated to 200° C. During this operation, 15 ml of a liquid distilled off which substantially consisted of $H_2O$. After the addition of 110.3 g (0.75 mols) of p-dichlorobenzene and 1.36 g (1 mol% based on p-dichlorobenzene) of 1,2,4-trichlorobenzene, together with 35 g of 1,4-dimethylpiperazinone, the autoclave was closed and heated to 245° C. over a period of 1 hours, the pressure rising to 4.5 bars. After 7 hours, the mixture was cooled to room temperature and the product was thoroughly washed with water in order to remove salts which had formed. After drying at 120° C. under a water jet vacuum, the light-grey product weighed 75.3 g (92.9% yield, based on dichlorobenzene). It has a melting range of 278°–284° C.

We claim:

1. A process for the production of high molecular weight polyarylene sulphide from (a) 0 to 100 mol % of at least one dihalogen aromatic compound corresponding to the formula

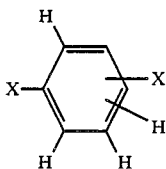   (I)

and from 100 to 0 mol % of at least one dihalogen aromatic compound corresponding to the formula

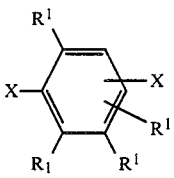   (II)

wherein

X represents meta- or para-positioned chlorine or bromine relative to each other, and $R^1$ is the same or different and represent hydrogen, alkyl, cycloalkyl, aryl, alkylaryl, arylalkyl, or two radicals of $R^1$ link together to form an aromatic ring or heterocyclic ring having 1–3 nitrogen, oxygen or sulfur heteroatoms, and one radical $R^1$ is always different from hydrogen, and (b) from 0 to 3 mol %, based on the total of components (a) and (b), of a tri- or tetra-halogen aromatic compound corresponding to the formula $ArX_n$   (III)

wherein

Ar represents an aromatic ring or heterocyclic ring having 1–3 nitrogen, oxygen or sulfur heteroatoms, X represents chlorine or bromine, and n represents 3 or 4, and (c) alkali sulphide, or a mixture thereof with alkali hydroxide, the molar ratio of (a+b):c ranging from 0.85:1 to 1.15:1, and, (d) a piperazinone organic solvent with the molar ratio of alkali sulphides (c) to organic solvent (d) ranging from 1:2 to 1:15, and the reacting temperature is from 160° to 265° C.

2. A process according to claim 1 wherein the piperazinone solvent has the formula

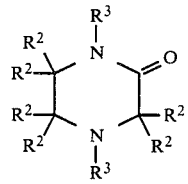   (IV)

wherein $R^2$ which is the same or different and represents hydrogen, alkyl, aralky or cycloalkyl, or two radicals $R^2$ may be linked to form an aromatic or cycloaliphatic ring.

3. A process according to claim 1 wherein the reaction temperature is from 165° to 250° C.

4. A process according to claim 1 wherein the organic solvent (d) is 1,4-dimethylpiperazinone.

5. A process according to claim 1 wherein the polyarylene sulphide produced is a branched polyarylene sulphide.

6. A process according to claim 1 wherein component (d) also contains at least one additional co-solvent.

7. A process according to claim 6 wherein the organic solvent (d) contains from 0.02 to 100 mol %, based on alkali sulphide, of an N,N-dialkylcarboxylic acid amide co-solvent.

8. A process according to claim 1 wherein the dihalogen aromatic compound is 1,4-dichlorobenzene, 1,4-dibromobenzene, or a mixture thereof.

9. A process according to claim 1 wherein component (d) also contains a reaction catalyst.

* * * * *